(12) United States Patent
Liu et al.

(10) Patent No.: US 7,871,168 B2
(45) Date of Patent: Jan. 18, 2011

(54) ILLUMINATION SYSTEM FOR DUAL-LAMP PROJECTOR

(75) Inventors: Chin-Ku Liu, Hsinchu (TW); Chien-Chung Liao, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 517 days.

(21) Appl. No.: 11/951,332

(22) Filed: Dec. 6, 2007

(65) Prior Publication Data

US 2009/0027631 A1    Jan. 29, 2009

(30) Foreign Application Priority Data

Jul. 27, 2007    (TW) .............................. 96127470 A

(51) Int. Cl.
*G03B 21/14*    (2006.01)
(52) U.S. Cl. ............................ 353/84; 353/31; 348/473
(58) Field of Classification Search .................. 353/84, 353/98, 121, 31, 32; 348/742–748, 813
See application file for complete search history.

(56) References Cited

U.S. PATENT DOCUMENTS

| | | | |
|---|---|---|---|
| 5,650,832 A | 7/1997 | Poradish et al. | |
| 5,964,150 A * | 10/1999 | Kato et al. | 101/216 |
| 6,005,939 A | 12/1999 | Fortenberry et al. | |
| 6,147,720 A * | 11/2000 | Guerinot et al. | 348/744 |
| 6,425,677 B1 | 7/2002 | Chuang | |
| 6,545,814 B2 | 4/2003 | Bartlett et al. | |
| 6,758,579 B2 * | 7/2004 | Ishikawa et al. | 362/238 |
| 2002/0105729 A1 * | 8/2002 | Richards et al. | 359/634 |
| 2005/0185148 A1 * | 8/2005 | Davis et al. | 353/84 |
| 2006/0007407 A1 * | 1/2006 | Matsui | 353/84 |
| 2007/0040995 A1 * | 2/2007 | Tangen | 353/84 |

OTHER PUBLICATIONS

"1st Office Action of China counterpart application", issued on Aug. 21, 2009, p. 1-3.

* cited by examiner

*Primary Examiner*—Thanh X Luu
*Assistant Examiner*—Francis M Legasse, Jr.
(74) *Attorney, Agent, or Firm*—Jianq Chyun IP Office

(57) ABSTRACT

An illumination system includes a first light source, a second light source, a light-uniforming component and a color wheel. The first light source is disposed at a side of the color wheel and provides a first light beam, and the second light source is disposed at another side of the color wheel and provides a second light beam. The light-uniforming component has a light incidence end and a light emitting end opposite to the light incidence end, and the first light source and the second light source are disposed beside the light incidence end. The color wheel includes a plurality of filter units with different colors, each includes a transmissive portion and a reflective portion for respectively making a part of the first light beam pass through to reach the light incidence end, and reflecting a part of the second light beam to reach the light incidence end.

14 Claims, 9 Drawing Sheets

ILLUMINATION SYSTEM FOR DUAL-LAMP PROJECTOR

CROSS-REFERENCE TO RELATED APPLICATION

This application claims the priority benefit of Taiwan application serial no. 96127470, filed on Jul. 27, 2007. The entirety of the above-mentioned patent application is hereby incorporated by reference herein and made a part of this specification.

BACKGROUND OF THE INVENTION

1. Field of the Invention

The present invention generally relates to an illumination system for a projector, and more particularly, to an illumination system for a dual-lamp projector.

2. Description of Related Art

FIG. 1 is a diagram of a conventional dual-lamp illumination system. Referring to FIG. 1, a conventional dual-lamp illumination system 100 includes a first light source 110, a second light source 120, a light-combining component 130, an light integration rod (LIR) 140 and a color wheel 150. The LIR 140 has a light incidence end 142 and a light emitting end 144, the light-combining component 130 is disposed beside the light incidence end 142 of the LIR 140. The light-combining component 130 is located on optical paths of the light beam L10 emitted from the first light source 110 and the light beam L20 emitted from the second light source 120 so as to combine the light beam L10 and the light beam L20. The color wheel 150 is disposed beside the light emitting end 144 of the LIR 140.

After the light beam L10 passes through the light-combining component 130, the light beam L10 enters the LIR 140 from the light incidence end 142 thereof, while the light beam L20 is reflected by the light-combining component 130 and then enters the LIR 140 from the light incidence end 142 thereof. The light beam L10 and the light beam L20 in the LIR 140 would form an illumination beam L30 with substantial uniformity that emits out from the light emitting end 144 thereof and then enters the color wheel 150. The illumination beam L30 is filtered into a light beam with different colors by different portions of the color wheel 150 through which the illumination beam L30 passes.

FIG. 2 is a diagram of the color wheel of FIG. 1. Referring to FIG. 2, the color wheel 150 has a red filter portion 152, a green filter portion 154 and a blue filter portion 156. When the illumination beam L30 passes through the red filter portion 152, it is filtered into a red light beam; when the illumination beam L30 passes through the green filter portion 154, it is filtered into a green light beam; when the illumination beam L30 passes through the blue filter portion 156, it is filtered into a blue light beam.

However, when the illumination beam L30 is incident upon a joining boundary 150a of two adjacent light filter portions, it is incident upon two color filter portions simultaneously so that an non-uniform-color light is produced, which would reduce the display quality of the projector employing the dual-lamp illumination system 100. In addition, although the dual light sources are able to increase the luminance of a frame, but such a design requires an additional a light-combining component 130 to introduce two light beams emitted from the two light sources into the LIR 140, which accordingly increases the weight and the volume of the dual-lamp illumination system 100.

SUMMARY OF THE INVENTION

Accordingly, the present invention is directed to an illumination system with a lighter weight and smaller volume for providing an illumination beam with uniform colors.

Other objectives and advantages of the present invention should be further indicated by the disclosures of the present invention, and omitted herein for simplicity.

To achieve one of, a part of or all of the above-mentioned objectives, or to achieve other objectives, an embodiment of the present invention provides an illumination system, which includes a first light source, a second light source, a light-uniforming component and a color wheel. The first light source is adapted for providing a first light beam, and the second light source is adapted for providing a second light beam. The light-uniforming component has a light incidence end and a light emitting end opposite to the light incidence end, and the first light source and the second light source are disposed at a side of the light incidence end. The first light source is disposed at a side of the color wheel, while the second light source and the light-uniforming component are disposed at another side of the color wheel, wherein the color wheel includes a plurality of filter units of different colors, each of the filter units includes a transmissive portion and a reflective portion, the transmissive portion is for a part of the first light beam to pass through to reach the light incidence end and the reflective portion is for reflecting a part of the second light beam to the light incidence end.

An embodiment of the present invention also provides an illumination system, which includes a first light source, a second light source, a light-uniforming component, a first color wheel and a second color wheel. The first light source is adapted for providing a first light beam, and the second light source is adapted for providing a second light beam. The light-uniforming component has a light incidence end and a light emitting end opposite to the light incidence end, and the first light source and the second light source are disposed at a side of the light incidence end. The first color wheel is disposed beside the light incidence end and the first color wheel faces a part of the light incidence end, wherein the first light beam reaches the light incidence end via the first color wheel. The second color wheel is disposed beside the light incidence end and faces another part of the light incidence end, wherein the second light beam reaches the light incidence end via the second color wheel.

The present invention provides an illumination system including a first light source, a second light source, a light-uniforming component, a first color wheel, a second color wheel, a first photo sensor, a second photo sensor and a control unit. The first light source is adapted for providing a first light beam, and the second light source is adapted for providing a second light beam. The light-uniforming component has a light incidence end and a light emitting end opposite to the light incidence end, and the first light source and the second light source are disposed at a side of the light incidence end. The first color wheel is disposed beside the light incidence end and faces a part of the light incidence end, wherein the first light beam reaches the light incidence end via the first color wheel. The second color wheel is disposed beside the light incidence end and faces another part of the light incidence end, wherein the second light beam reaches the light incidence end via the second color wheel. The first photo sensor is adapted for sensing the first light beam passing through the first color wheel to produce a first sensing signal, the second photo sensor is adapted for sensing the second light beam passing through the second color wheel to produce a second sensing signal. The control unit is electrically connected to the first color wheel, the second color wheel, the first photo sensor and the second photo sensor, wherein the control unit is adapted for synchronously rotating the first color wheel and the second color wheel on the basis of the first sensing signal and the second sensing signal.

Based on the above description, the color wheel in the embodiments of the present invention is disposed at the side of the light incidence end of the light-uniforming component, therefore, after the first light beam and the second light beam pass through a joining boundary of the filter units of the color wheel, the light beam with non-uniform color further passes through a light-uniforming component to obtain a light beam with substantially uniform color. In this way, the projector employing the illumination system is capable of producing frames with better display quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
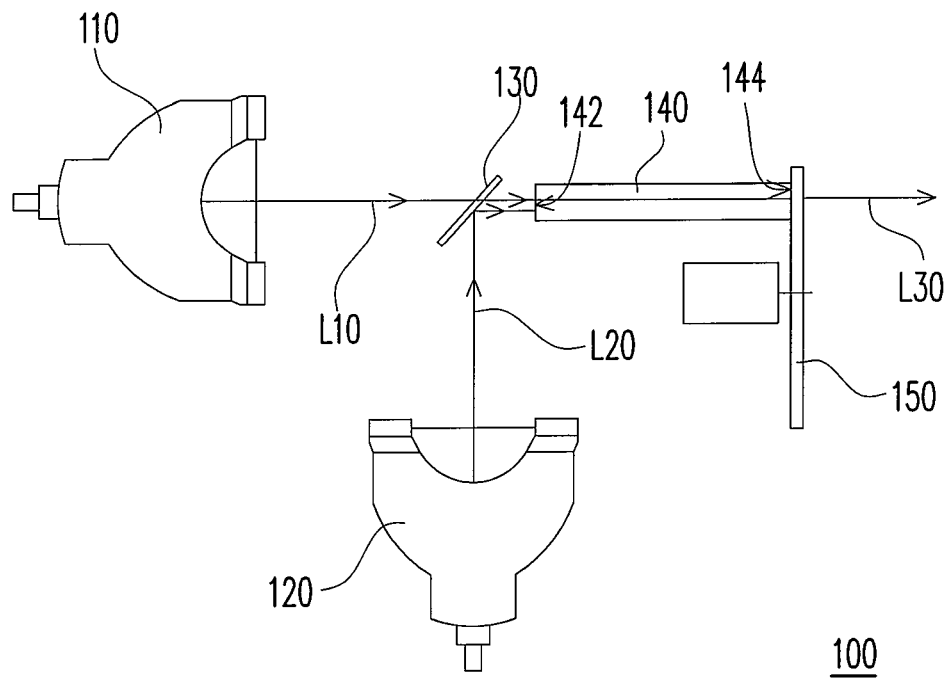
FIG. 1 is a diagram of a conventional dual-lamp illumination system.
Figure 2:
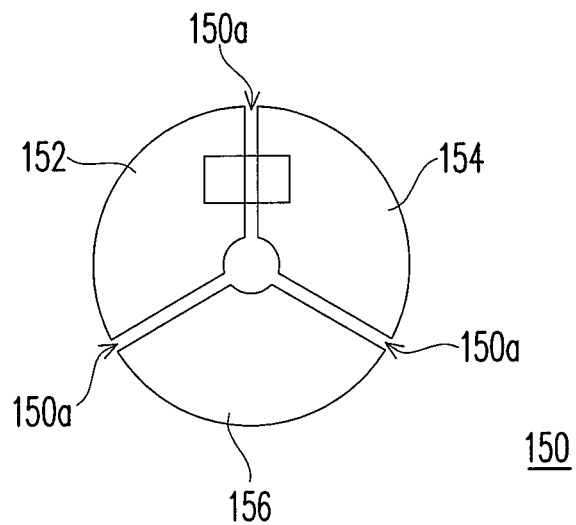
FIG. 2 is a diagram of the color wheel of FIG. 1.

Reference will now be made in detail to the present preferred embodiments of the invention, examples of which are illustrated in the accompanying drawings. Wherever possible, the same reference numbers are used in the drawings and the description to refer to the same or like parts.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 3:
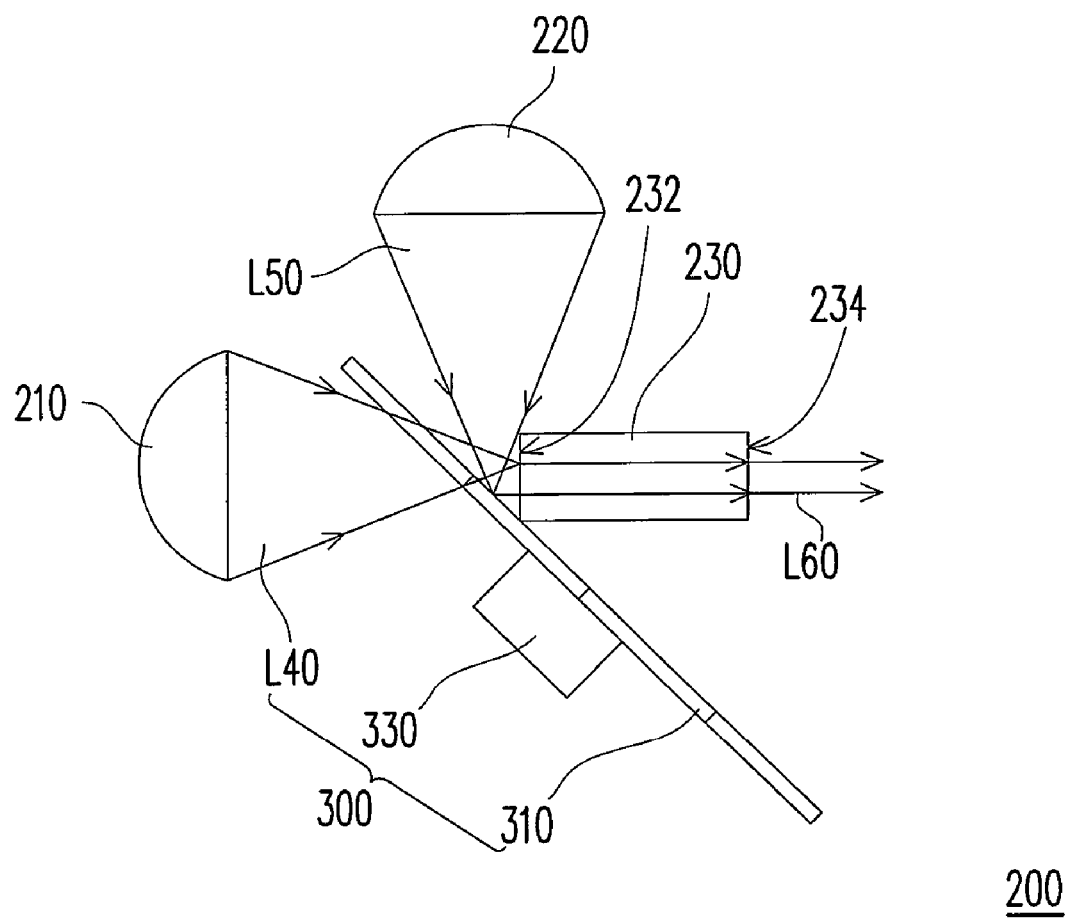
FIG. 3 is a diagram of an illumination system according to an embodiment of the present invention.
Figure 4:
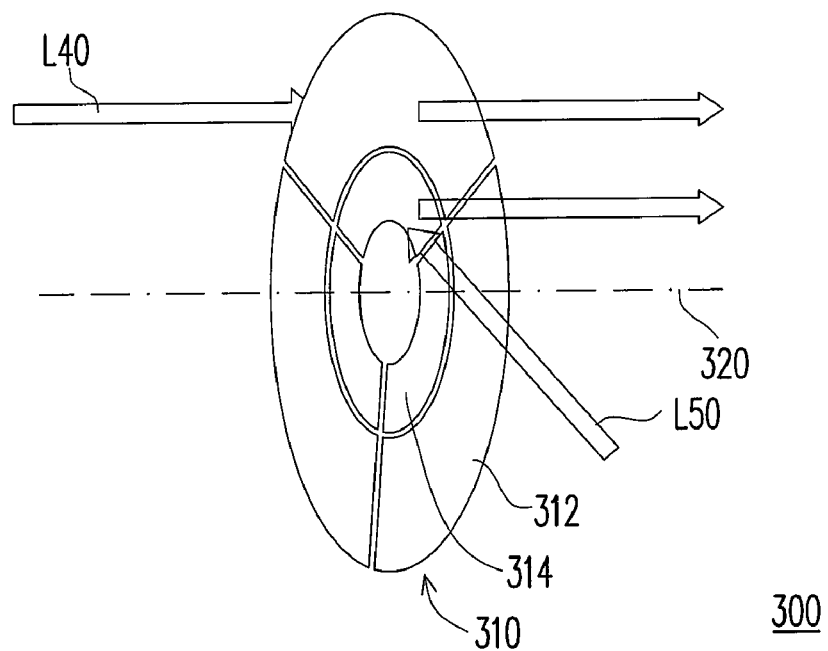
FIG. 4 is a diagram of the color wheel of the illumination system in FIG. 3.

FIG. 3 is a diagram of an illumination system according to an embodiment of the present invention. FIG. 4 is a diagram of the color wheel of the illumination system in FIG. 3. Referring to FIGS. 3 and 4, an illumination system 200 includes a first light source 210, a second light source 220, a light-uniforming component 230 and a color wheel 300. The light-uniforming component 230 is, for example, an light integration rod (LIR) having a light incidence end 232 and a light emitting end 234 opposite to the light incidence end 232, and the first light source 210 and the second light source 220 are disposed at a side of the light incidence end 232. The first light source 210 is disposed at a side of the color wheel 300, and the second light source 220 and the light-uniforming component 230 are disposed at another side of the color wheel 300.

The first light source 210 provides a first light beam L40 and the second light source 220 provides a second light beam L50. The color wheel 300 may include a plurality of filter units 310 with different colors. For example, the colors of the filter units 310 include red color, green color and blue color. Each of the filter units 310 includes a transmissive portion 312 and a reflective portion 314, wherein the transmissive portion 312 is adapted for a part of the first light beam L40 to pass through to reach the light incidence end 232, the reflective portion 314 is adapted for reflecting a part of the second light beam L50 to the light incidence end 232, and after the first light beam L40 and the second light beam L50 pass through the light-uniforming component 230, an illumination beam L60 with substantial uniformity is produced.

In more detail, the first light beam L40 and the second light beam L50 are, for example, white light beams. The transmissive portion 312 of the red filter unit 310 allows the red light beam in the first light beam L40 to pass through and reach the light incidence end 232, while the reflective portion 314 of the red filter unit 310 reflects the red light beam in the second light beam L50 to the light incidence end 232. Likewise, the green filter unit 310 and the blue filter unit 310 are able to respectively make the first light beam L40 and the second light beam L50 form a green light beam and a blue light beam to be incident upon the light incidence end 232.

In the present embodiment, the color wheel 300 has, for example, an actuator 330, which may include, for example, a motor, for driving the filter units 310. In addition, the actuator 330 has a rotation axis 320. The reflective portion 314 is located between the rotation axis 320 and the transmissive portion 312, and the transmissive portion 312 and the reflective portion 314 are on a same plane.

Since the color wheel 300 according to an embodiment of the present embodiment is disposed at a position on the optical path prior to the light-uniforming component 230, thus, after the first light beam L40 and the second light beam L50 pass through a joining boundary of two adjacent filter units 310 of the color wheel 300, the non-uniform-color light beam is rendered uniform while passing through the light-uniforming component 230, so as to enable a projector employing the illumination system 200 to produce frames with more uniform color. Besides having the light filtering function, the color wheel 300 in the embodiment also has a light-combining function, that is, the color wheel 300 is able to introduce the first light beam L40 and the second light beam L50 into the light-uniforming component 230. Therefore, the illumination system 200 does not require any additional light-combining components, so that the volume and weight of the illumination system 200 is reduced and then the volume and weight of the projector employing the illumination system 200 is also reduced.

Besides, the transmissive portion 312 and the reflective portion 314 of each filter unit 310 may have different optical properties. For example, in a filter unit 310, the transmissive waveband of the transmissive portion 312 is greater than the reflective waveband of the reflective portion 314. The waveband in the embodiment means the wavelength range of transmissive light or reflective light. Thus, the first light beam L40 passes through the light-uniforming component 230 after passing through the transmissive portion 312 having a greater waveband; the produced illumination beam L60 has higher luminance but worse color saturation. The second light beam L50 passes through the light-uniforming component 230 after reflected by the reflective portion 314 having a less waveband, the produced illumination beam L60 has lower luminance but better color saturation. As a result, when an illumination beam L60 with high luminance is needed, the first light source 210 is turned on; when an illumination beam L60 with better color saturation is needed, the second light source 220 is turned on. Therefore, for a projector employing the illumination system 200, a user is allowed to make the projector provide frames with higher luminance or frames with better color saturation.

Figure 5:
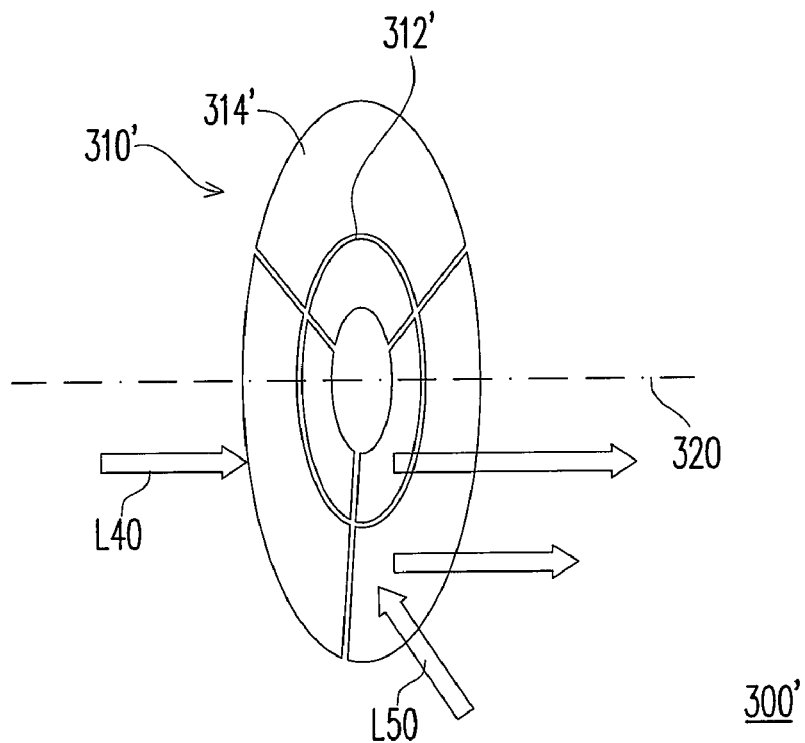
FIG. 5 is a diagram of a color wheel according to another embodiment of the present invention.

FIG. 5 is a diagram of a color wheel according to another embodiment of the present invention. Referring to FIG. 5, the color wheel 300' in the embodiment is similar to the color wheel 300 in FIG. 4 except that the transmissive portions 312' of all the filter units 310' of the color wheel 300' are located between a rotation axis 320 and reflective portions 314'.

Figure 6:
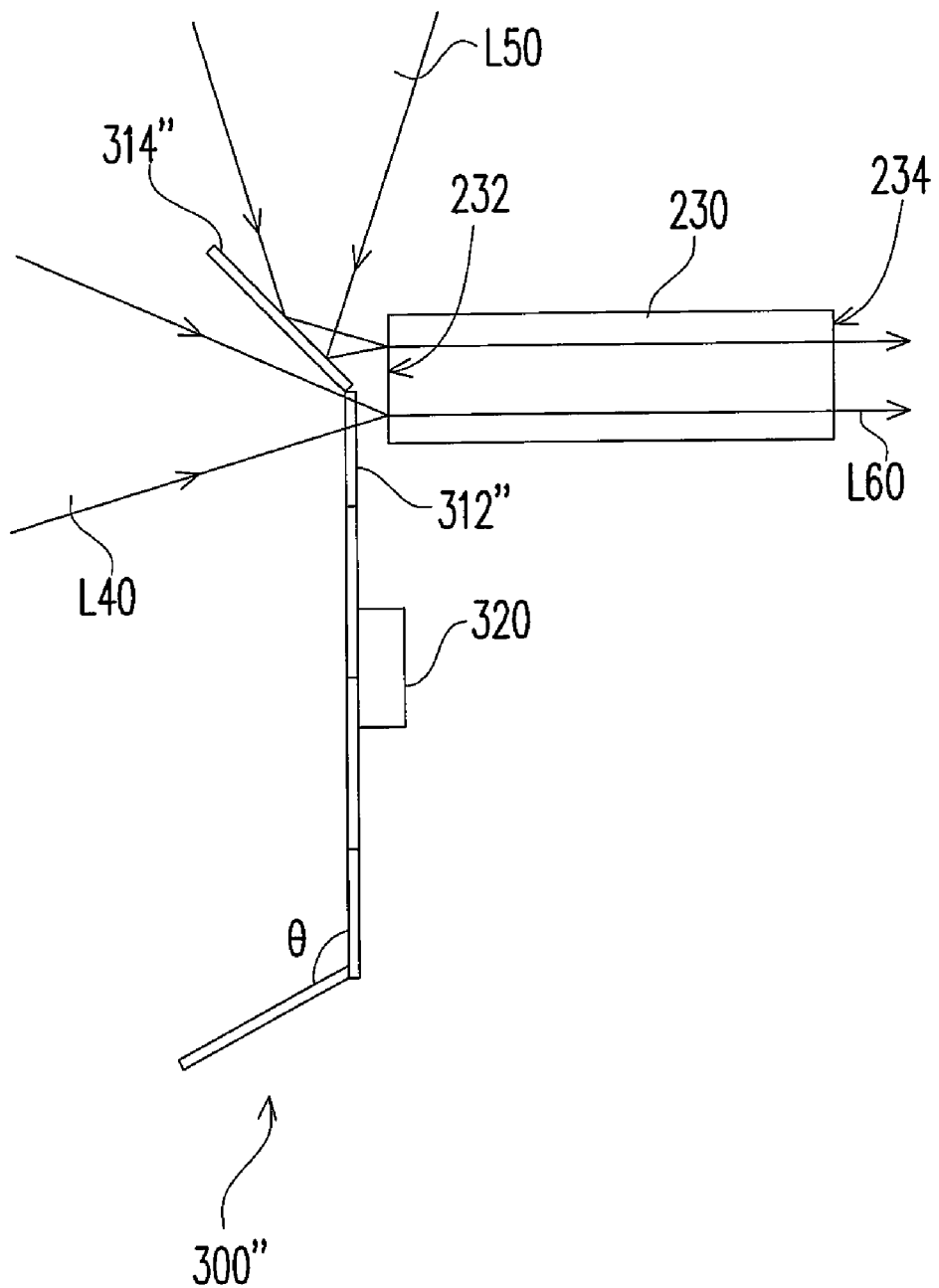
FIG. 6 is a diagram of a color wheel and a light-uniforming component according to yet another embodiment of the present invention.
Figure 7:
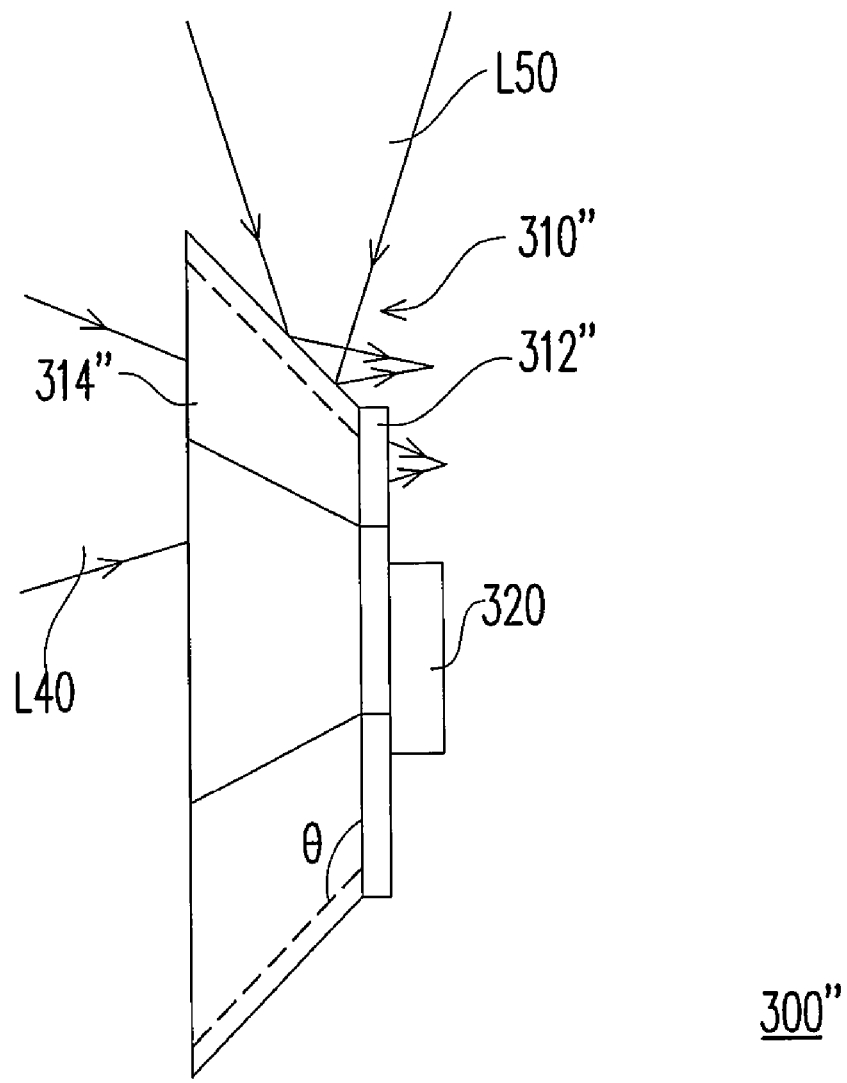
FIG. 7 is a schematic side view of the color wheel in FIG. 6.

FIG. 6 is a diagram of a color wheel and a light-uniforming component according to yet another embodiment of the present invention. FIG. 7 is a schematic side view of the color wheel in FIG. 6. Referring to FIGS. 6 and 7, the color wheel 300" herein is similar to the color wheel 300 in FIG. 4 except that the transmissive portions 312" of all the filter units 310" of the color wheel 300" are located on a same plane and there is an included angle θ between the reflective portion 314" and the transmissive portion 312" of each filter unit 310".

Figure 8:
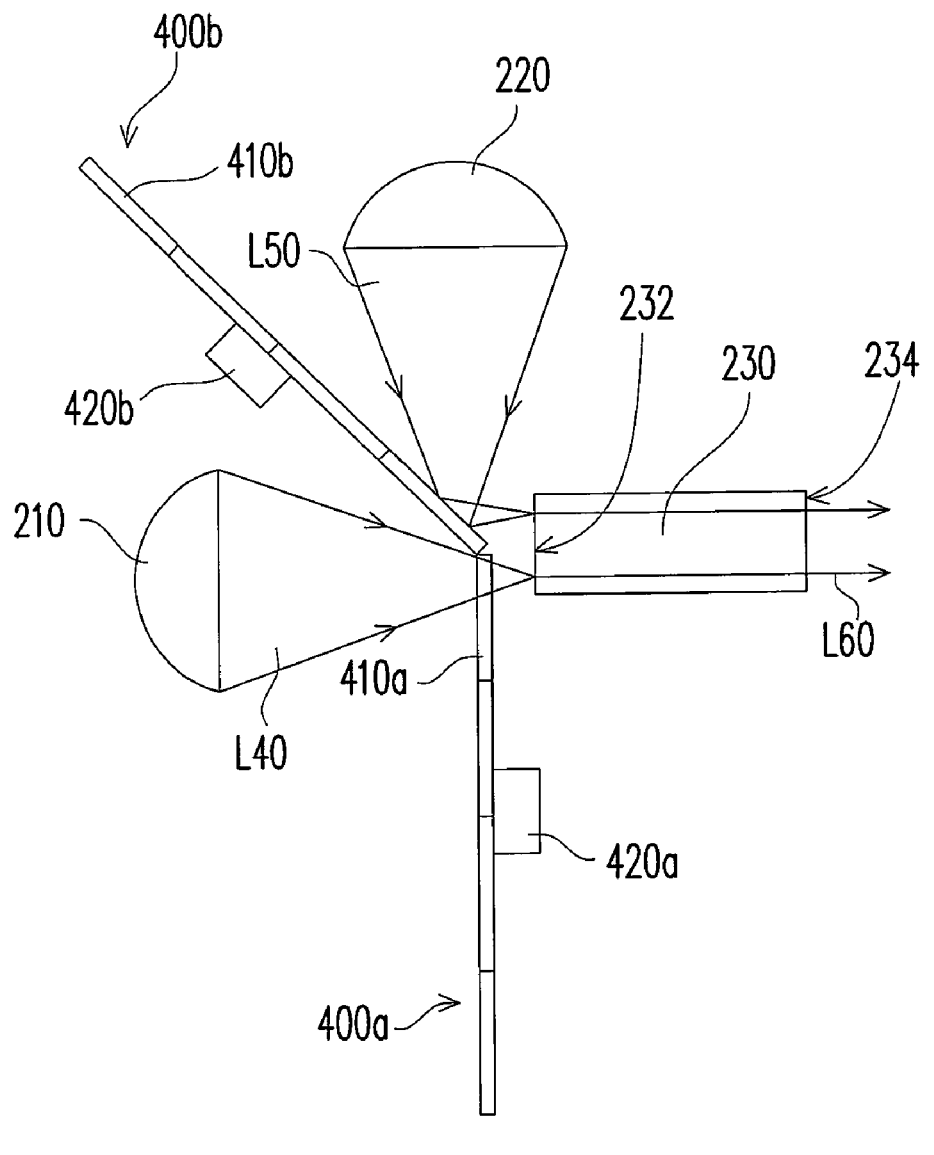
FIG. 8 is a diagram of an illumination system according to another embodiment of the present invention.
Figure 9:
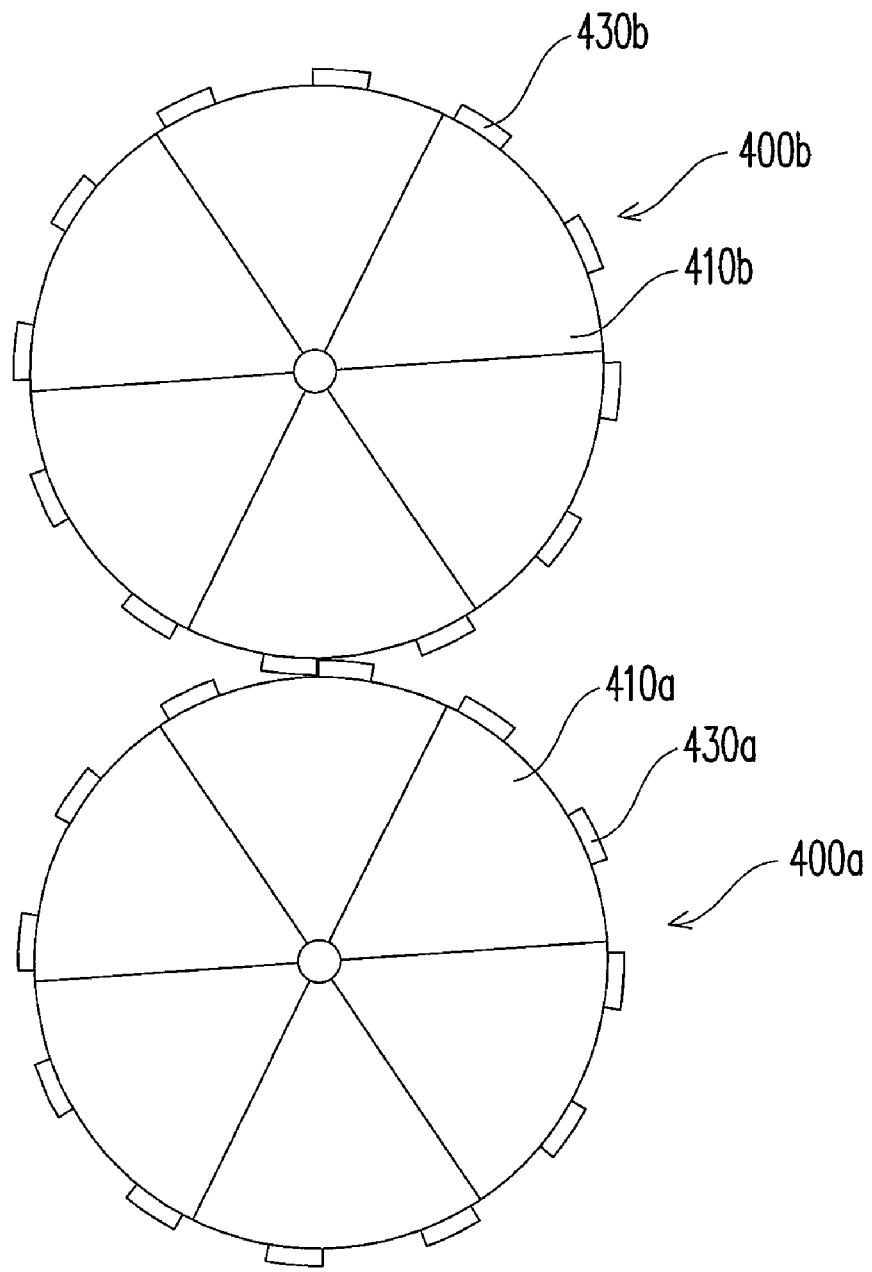
FIG. 9 is a diagram of a first color wheel and a second color wheel.

FIG. 8 is a diagram of an illumination system according to another embodiment of the present invention. FIG. 9 is a diagram of a first color wheel and a second color wheel. Referring to FIGS. 8 and 9, the illumination system 200a of the embodiment includes a first light source 210, a second light source 220, a light-uniforming component 230, a first color wheel 400a and a second color wheel 400b. The first light source 210 provides a first light beam L40, the second light source 220 provides a second light beam L50, the light-uniforming component 230 has a light incidence end 232 and a light emitting end 234 opposite to the light incidence end 232, and the first light source 210 and the second light source 220 are disposed at a side of the light incidence end 232.

The first color wheel 400a is disposed beside the light incidence end 232 and facing a part of the light incidence end 232, wherein the first light beam L40 enters the light incidence end 232 via the first color wheel 400a. The second color wheel 400b is disposed beside the light incidence end 232 and facing another part of the light incidence end 232. The second light beam L50 enters the light incidence end 232 via the second color wheel 400b. The first color wheel 400a includes a first actuator 420a and the second color wheel 400b includes a second actuator 420b, wherein the first actuator 420a and the second actuator 420b respectively comprise, for example, a motor.

In the embodiment, the first color wheel 400a and the second color wheel 400b may respectively include a plurality of filter units 410a and 410b with different colors. For example, the colors of the filter units 410a and 410b may include red color, green color and blue color. The filter units 410a of the first color wheel 400a allow a part of the first light beam L40 to pass through to reach the light incidence end 232; the filter units 410b of the second color wheel 400b reflect a part of the second light beam L50 to the light incidence end 232.

In more detail, the first light beam L40 and the second light beam L50 comprise, for example, white light beams. The red filter units 410a of the first color wheel 400a allow the red light beam in the first light beam L40 to pass through to enter the light incidence end 232, and the red filter units 410b of the second color wheel 400b reflect the red light beam in the second light beam L50 to the light incidence end 232. Likewise, the green filter units 410a of the first color wheel 400a, the green filter units 410b of the second color wheel 400b, the blue filter units 410a of the first color wheel 400a and the blue filter units 410b of the second color wheel 400b are able to convert the first light beam L40 and the second light beam L50 into a green light beam and a blue light beam to be incident upon the light incidence end 232.

In addition, the filter units 410a of the first color wheel 400a and the filter units 410b of the second color wheel 400b have different optical properties. The transmissive waveband in the filter units 410a of the first color wheel 400a is greater than the reflective waveband in the filter units 410b of the second color wheel 400b. Thus, when an illumination beam L60 with high luminance is needed, the first light source 210 is turned on; when an illumination beam L60 with better color saturation is needed, the second light source 220 is turned on. Therefore, for a projector employing the illumination system 200, a user is allowed to make the projector provide frames with high luminance or frames with better color saturation.

The first light beam L40 and the second light beam L50 may be respectively incident upon the filter units 410a and the filter units 410b with the same color as that of the filter units 410a to produce light beams with the same color. In order to make the first light beam L40 and the second light beam L50 reach the filter units 410a and the filter units 410b with the same color as that of the filter units 410a, a plurality of wheel teeth 430a and 430b are respectively disposed on the edge of the first color wheel 400a and the edge of the second color wheel 400b, wherein the first color wheel 400a and the second color wheel 400b are engaged with each other by the wheel teeth 430a and 430b so that the first color wheel 400a and the second color wheel 400b may synchronously rotate.

Figure 10:
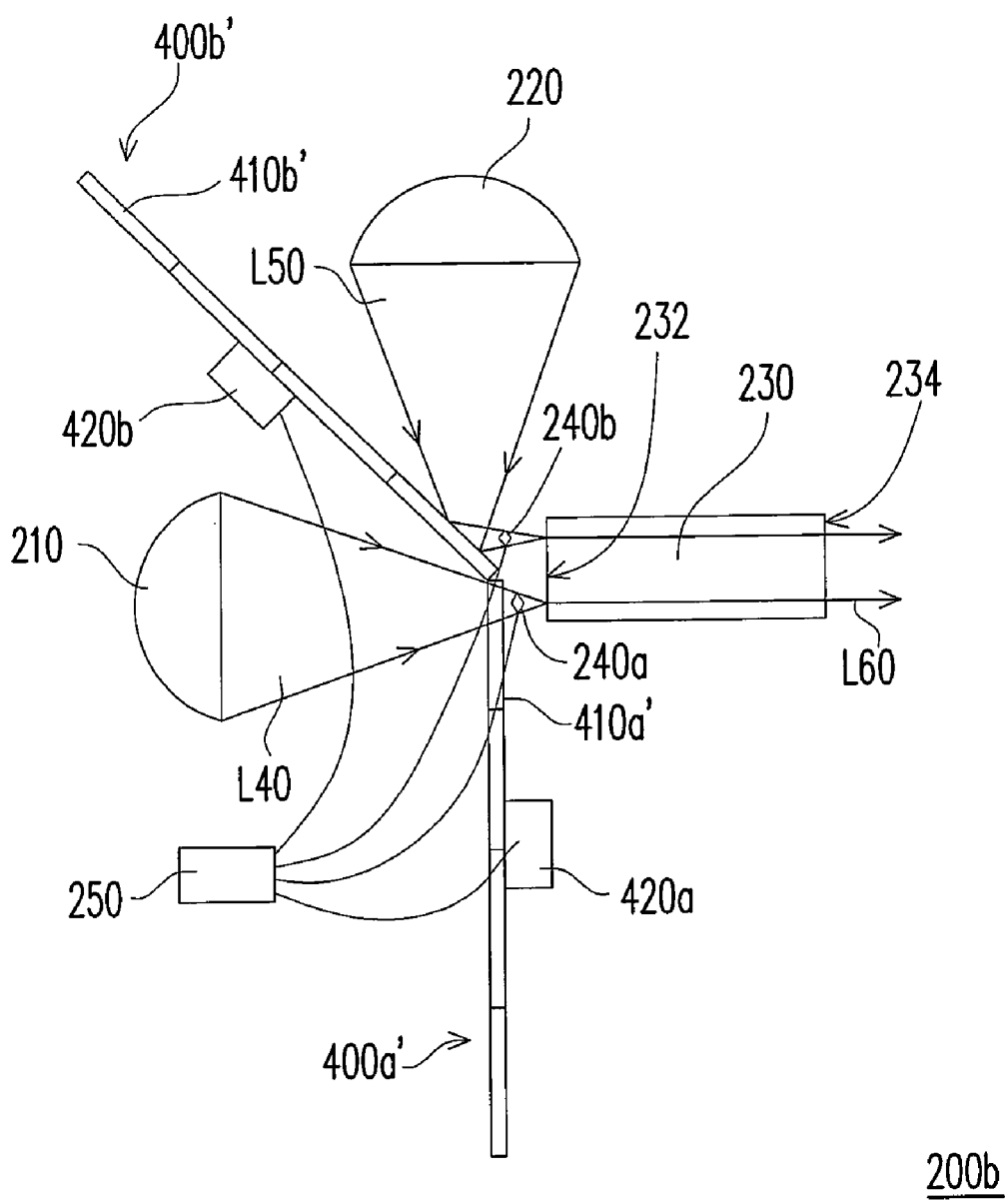
FIG. 10 is a diagram of an illumination system according to yet another embodiment of the present invention.

FIG. 10 is a diagram of an illumination system according to yet another embodiment of the present invention. Referring to FIG. 10, the illumination system 200b of the present embodiment is similar to the illumination system 200a described with reference to FIG. 8 except for the first color wheel 400a' and the second color wheel 400b' have no wheel teeth, and includes a first photo sensor 240a, a second photo sensor 240b and a control unit 250. The first photo sensor 240a is adapted for sensing the first light beam L40 passing through the filter units 410a' to produce a first sensing signal; the second photo sensor 240b is adapted for sensing the second light beam L50 passing through the filter units 410b' to produce a second sensing signal. The control unit 250 is electrically connected to the first color wheel 400a', the second color wheel 400b', the first photo sensor 240a and the second photo sensor 240b. The control unit 250 is adapted for synchronously rotating the first color wheel 400a' and the second color wheel 400b' on the basis of the first sensing signal and the second sensing signal.

The first photo sensor 240a and the second photo sensor 240b respectively sense the colors of the first light beam L40 passing through the filter units 410a' and the second light beam L50 passing through the filter units 410b' and respectively produce the first sensing signal and the second sensing signal. The control unit 250 controls the first color wheel 400a' and the second color wheel 400b' to rotate on the basis of the first sensing signal produced by the first photo sensor 240a and the second sensing signal produced by the second photo sensor 240b, so that the first light beam L40 and the second light beam L50 are simultaneously incident upon the filter units 410a' of the first color wheel 400a' and the filter units 410b' having the same color as 410a' of the second color wheel 400b'.

In addition to the above-mentioned methods, those skilled in the art would understand that other methods may be used to simultaneously rotate the first color wheel 400a' and the second color wheel 400b'. For example, a light-blocking block can be respectively disposed on the first color wheel 400a' and the second color wheel 400b', and the first photo sensor 240a and the second photo sensor 240b respectively sense the first light beam L40 passing through the filter units 410a' and the second light beam L50 passing through the filter units 410b' to decide whether or not the two light beams L40 and L50 are blocked. The control unit 250 synchronously rotates the first color wheel 400a' and the second color wheel 400b' on the basis of the first sensing signal produced by the first photo sensor 240a and the second sensing signal produced by the second photo sensor 240b, and further enables the first light beam L40 and the second light beam L50 to be incident upon the filter units 410a' of the first color wheel 400a' and the filter units 410b' having the same color as 410a' of the second color wheel 400b'.

Figure 11:
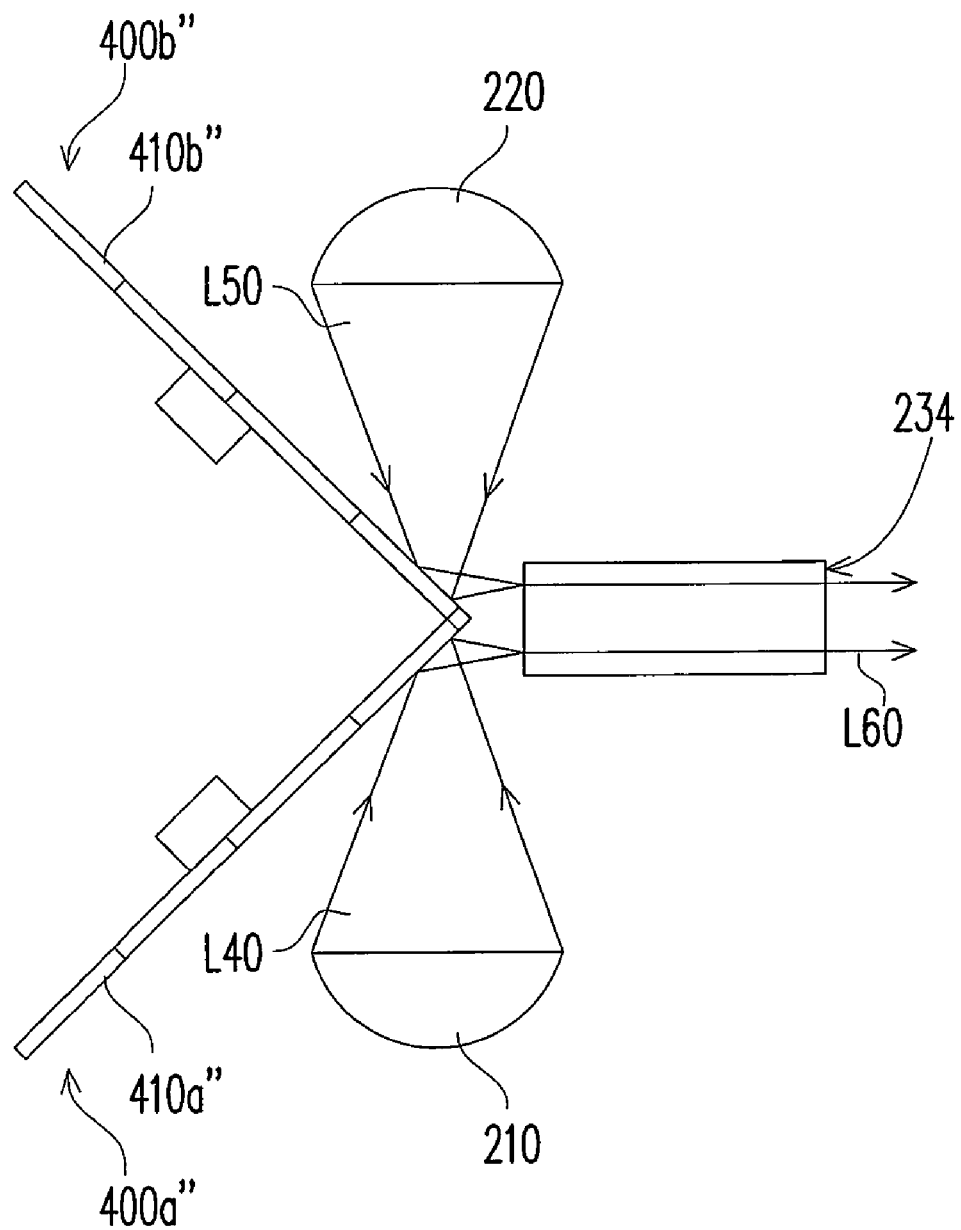
FIG. 11 is a diagram of an illumination system according to yet another embodiment of the present invention.

FIG. 11 is a diagram of an illumination system according to yet another embodiment of the present invention. Referring to FIG. 11, the illumination system 200c in the embodiment includes a first color wheel 400a" and a second color wheel 400b". The structures of the two color wheels 400a" and 400b" are similar to the second color wheel 400b' of the illumination system 200b (as shown in FIG. 10) except that the filter units 410a" of the first color wheel 400a" reflect a part of the first light beam L40 to the light incidence end 232, while the filter units 410b" of the second color wheel 400b" reflect a part of the second light beam L50 to the light incidence end 232.

In summary, the embodiments of the present invention have at least one of, or a part of, or all of the following advantages:

1. Since the color wheel (300, 300', 300", 400a, 400b, 400a', 400b', 400a" and 400b") of the embodiments of the present invention is disposed at a position on the optical path prior to the light-uniforming component 230, after the first light beam L40 and the second light beam L50 pass through a joining boundary of two adjacent filter units of the color wheel, the non-uniform-color light beam may further pass the light-uniforming component 230 and then be uniformized. Thus, a projector adopting the embodiment of the present invention may produce frames with more uniform color.

2. In addition to light-filtering function, the color wheel (300, 300', 300", 400a, 400b, 400a', 400b', 400a" and 400b") of the embodiments of the present invention has light-combining function as well, therefore, the color wheel (300, 300', 300", 400a, 400b, 400a', 400b', 400a" and 400b") may introduce the first light beam L40 and the second light beam L50 to the light-uniforming component 230. Thus, the volume and weight of the illumination system (200, 200a, 200b and 200c) is reduced, which accordingly contributes to reduce the volume and weight of the projector.

3. By means of different optical properties in terms of transmitting and reflecting of the filter units (310, 310', 310", 410a, 410b, 410a', 410b', 410a" and 410b"), i.e. the difference between the transmissive waveband and the reflective waveband, the first light beam L40 passing through filter units with a greater waveband (310, 310', 310", 410a, 410b, 410a', 410b', 410a" and 410b") has higher luminance, while the second light beam L50 passing through filter units with a less waveband (310, 310', 310", 410a, 410b, 410a', 410b', 410a" and 410b") has lower luminance. Therefore, a user is allowed to make the projector provide frames with higher luminance or frames with better color saturation by selectively turning on two different light sources.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the under-

What is claimed is:

1. An illumination system, comprising:
   a first light source, for providing a first light beam;
   a second light source, for providing a second light beam;
   a light-uniforming component, having a light incidence end and a light emitting end opposite to the light incidence end, wherein the first light source and the second light source are disposed at a side of the light incidence end; and
   a color wheel, wherein the first light source is disposed at a side of the color wheel, the second light source and the light-uniforming component are disposed at another side of the color wheel, the color wheel comprises a plurality of filter units with different colors, each of the filter units comprises a transmissive portion and a reflective portion, the transmissive portion is adapted for a color of the first light beam to pass through to reach the light incidence end, and the reflective portion is adapted for reflecting a color of the second light beam to the light incidence end,
   wherein the color of the first light beam and the color of the second light beam are the same.

2. The illumination system according to claim 1, wherein the color wheel further includes a rotation axis, and the transmissive portion of each of the filter units is located between the rotation axis and the reflective portion of each of the filter units.

3. The illumination system according to claim 2, wherein the transmissive portion and the reflective portion of each of the filter units are located on a same plane.

4. The illumination system according to claim 2, wherein the transmissive portion of each of the filter units is located on a same plane, and an included angle is formed between the reflective portion and the transmissive portion of each of the filter units.

5. The illumination system according to claim 1, wherein the color wheel further includes a rotation axis and the reflective portion of each of the filter units is located between the rotation axis and the transmissive portion of each of the filter units.

6. The illumination system according to claim 5, wherein the transmissive portion and the reflective portion of each of the filter units are located on a same plane.

7. An illumination system, comprising:
   a first light source, for providing a first light beam;
   a second light source, for providing a second light beam;
   a light-uniforming component, having a light incidence end and a light emitting end opposite to the light incidence end, wherein the first light source and the second light source are disposed at a side of the light incidence end;
   a first color wheel, disposed beside the light incidence end and facing a part of the light incidence end, wherein the first light beam reaches the light incidence end via the first color wheel, and after being processed by the first color wheel, the first light beam directly reaches the light incidence end without passing through any optical component; and
   a second color wheel, disposed beside the light incidence end and facing another part of the light incidence end, wherein the second light beam reaches the light incidence end via the second color wheel, and after being processed by the second color wheel, the second light beam directly reaches the light incidence end without passing through any optical component.

8. The illumination system according to claim 7, wherein the first color wheel and the second color wheel respectively comprise a plurality of filter units with different colors, the filter units of the first color wheel are adapted for reflecting a part of the first light beam to the light incidence end, and the filter units of the second color wheel are adapted for reflecting a part of the second light beam to the light incidence end.

9. The illumination system according to claim 7, wherein the first color wheel and the second color wheel respectively comprise a plurality of filter units with different colors, the filter units of the first color wheel are adapted for a part of the first light beam to pass through to reach the light incidence end, and the filter units of the second color wheel are adapted for reflecting a part of the second light beam to the light incidence end.

10. The illumination system according to claim 7, wherein a plurality of wheel teeth are respectively disposed on an edge of the first color wheel and an edge of the second color wheel, and the first color wheel is engaged with the second color wheel.

11. The illumination system according to claim 7, further comprising:
    a first photo sensor, for sensing the first light beam passing through the first color wheel to produce a first sensing signal;
    a second photo sensor, for sensing the second light beam passing through the second color wheel to produce a second sensing signal; and
    a control unit, electrically connected to the first color wheel, the second color wheel, the first photo sensor and the second photo sensor, wherein the control unit is adapted for synchronously rotating the first color wheel and the second color wheel on the basis of the first sensing signal and the second sensing signal.

12. An illumination system, comprising:
    a first light source, for providing a first light beam;
    a second light source, for providing a second light beam;
    a light-uniforming component, having a light incidence end and a light emitting end opposite to the light incidence end, wherein the first light source and the second light source are disposed at a side of the light incidence end;
    a first color wheel, disposed beside the light incidence end and facing a part of the light incidence end, wherein the first light beam passes through the first color wheel to reach the light incidence end, and after being processed by the first color wheel, the first light beam directly reaches the light incidence end without passing through any optical component;
    a second color wheel, disposed beside the light incidence end and facing another part of the light incidence end, wherein the second light beam passes through the second color wheel to reach the light incidence end, and after being processed by the second color wheel, the second light beam directly reaches the light incidence end without passing through any optical component;

a first photo sensor, for sensing the first light beam passing through the first color wheel to produce a first sensing signal;

a second photo sensor, for sensing the second light beam passing through the second color wheel to produce a second sensing signal; and a control unit, electrically connected to the first color wheel, the second color wheel, the first photo sensor and the second photo sensor, wherein the control unit is adapted for synchronously rotating the first color wheel and the second color wheel on the basis of the first sensing signal and the second sensing signal.

13. The illumination system according to claim 12, wherein the first color wheel and the second color wheel respectively comprise a plurality of filter units with different colors, the filter units of the first color wheel are adapted for reflecting a part of the first light beam to the light incidence end, and the filter units of the second color wheel are adapted for reflecting a part of the second light beam to the light incidence end.

14. The illumination system according to claim 12, wherein the first color wheel and the second color wheel respectively comprise a plurality of filter units with different colors, the filter units of the first color wheel are adapted for a part of the first light beam to pass through to reach the light incidence end, and the filter units of the second color wheel are adapted for reflecting a part of the second light beam to the light incidence end.

* * * * *